UNITED STATES PATENT OFFICE.

OSCAR C. HIRSCH AND ALVIN R. HARNES, OF CAPE GIRARDEAU, MISSOURI.

SEPARATOR FOR STORAGE BATTERIES.

1,358,207.  Specification of Letters Patent.  Patented Nov. 9, 1920.

No Drawing.  Application filed January 2, 1920. Serial No. 348,769.

*To all whom it may concern:*

Be it known that we, OSCAR C. HIRSCH and ALVIN R. HARNES, citizens of the United States, residing at Cape Girardeau, in the county of Cape Girardeau and State of Missouri, have invented certain new and useful Improvements in Separators for Storage Batteries, of which the following is a specification.

This invention relates to separators for storage batteries, and to a process of producing said separators, and it comprises a separator consisting of a wooden plate that has been exposed to boiling water at a high pressure, subjected to the action of superheated steam under high pressure, and treated with an aqueous solution of sulfuric acid; and it further comprises a method of producing such separators wherein a wooden plate is placed in boiling water under high pressure, then placed in a closed container and subjected to superheated steam under pressure, and then immersed in an aqueous solution of sulfuric acid; all as more fully hereinafter set forth, and as claimed.

Separators for storage batteries are generally made of wood or of rubber composition. They should be non-conductive, and sufficiently porous to permit flow of the electrolyte. If not sufficiently porous, the separators swell and warp causing them to split or crack.

In the present invention, we produce a separator for storage batteries in which the volatile chemical substances in the wood are removed by treatment with boiling water under high pressure and superheated steam under pressure, and in which the porosity of the plates is greatly increased by breaking open the small cells in the wood by superheated steam.

In the present process the wooden plates are first placed in boiling water, at a temperature of about 200° C., the boiling water removes some of the chemical substances that are highly volatile and which are objectionable in separators.

The plates are next passed through the steaming process wherein they are preferably placed in a closed container and subjected to dry superheated steam under high pressure. This treatment removes the less volatile chemical substances which remain in the wooden plates after the treatment with boiling water and breaks open the small cells in the wood, making a more porous separator which permits freer passage of the electrolytes between the plates of the battery. We have found that the steam treatment removes practically all the objectionable organic substances in the wood, but under some conditions, it is advisable to immerse the plates in an aqueous solution of sulfuric acid to dissolve and remove any remaining traces of the organic substances.

The above described process produces a separator plate for storage batteries which is highly porous and which will not swell due to the presence of the electrolyte in the plate. The elimination of this tendency to swell also eliminates warping of the plate and consequent splitting or cracking. The treatment with boiling water and the steam treatment remove the volatile organic substances present in the wood which are objectionable in a storage battery.

While we have described an advantageous embodiment of our invention, it is apparent that slight changes may be resorted to in performing the process and the above description is meant to be illustrative rather than restrictive.

What we claim is:

1. The method of making separators for storage batteries which comprises subjecting a wooden plate to boiling water under high pressure, subjecting said plate to superheated steam under high pressure, and then immersing said plate in an aqueous solution of sulfuric acid.

2. The method of making separators for storage batteries which comprises subjecting a wooden plate to superheated steam under high pressure, and then immersing said plate in an aqueous solution of sulfuric acid.

3. A separator for storage batteries formed of wood and being relatively porous, said separator comprising a wooden plate that has been subjected to boiling water under high pressure, then to superheated steam under high pressure, and then to an aqueous solution of sulfuric acid.

4. A separator for storage batteries formed of wood and being relatively porous, said separator comprising a wooden plate that has been subjected to superheated steam under high pressure, and then to an aqueous solution of sulfuric acid.

In testimony whereof we affix our signatures in presence of two witnesses.

OSCAR C. HIRSCH.
ALVIN R. HARNES.

Witnesses:
CHRIS J. HIRSCH,
W. H. OBERHEIDE.